3,210,407
1,2-DI(MONO/POLYHYDROXYALKYL)-3-METH-OXYARYLCYCLOPENTANOLS AND ESTERS

Leland J. Chinn, Morton Grove, Ill., assignor to G. D. Searle & Co., Chicago, Ill., a corporation of Delaware
No Drawing. Filed May 8, 1963, Ser. No. 279,025
6 Claims. (Cl. 260—488)

This invention relates to 3-alkoxyaryl-1,2-di(mono/polyhydroxyalkyl)cyclopentanols and esters, and to the processes for the manufacture thereof. More particularly, this invention provides new and useful chemical compounds of the formula

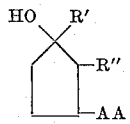

wherein R' and R'' each represent an alkyl radical substituted by at least one hydroxyl or an ester thereof with an alkanoic acid and AA represents an alkoxyaryl radical.

The alkoxyaryl radical called for is preferably a phenyl or naphthyl grouping substituted by a lower alkoxy grouping thus,

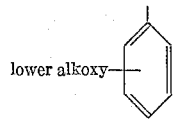

or

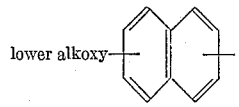

Those skilled in the art will recognize that a lower alkoxy grouping is a grouping of the formula <div align="center">lower alkyl—O—</div> the lower alkyl constituent being methyl, ethyl, propyl, isopropyl, butyl, isobutyl, sec-butyl, tert-butyl, pentyl, neopentyl, hexyl, isohexyl, heptyl, or like monovalent, saturated, acyclic, straight- or branched-chain hydrocarbon moiety of the formula

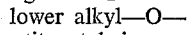
$$-C_nH_{2n+1}$$

wherein $n$ is a positive integer less than 8. The positioning of the alkoxy substituent with respect to the point of attachment of the phenyl or naphthyl nucleus to the cyclopentane ring is not critical, though p-alkoxyphenyl and 6-alkoxy-2-naphthyl radicals are perhaps optimally adapted to the purposes herein set forth.

The substituted alkyl radicals represented by R' are most desirably those of the formula

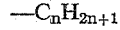
—CH$_2$CH$_2$X
—CHXCH$_2$X
—C(R)$_2$X wherein R represents hydrogen or a lower alkyl radical and X represents hydroxyl or an ester thereof with preferably a *lower* alkanoic acid, i.e.,

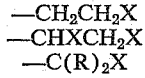

The substituted alkyl radicals represented by R'' are most desirably those of the formula

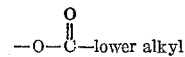

wherein R and X are defined as before.

The compounds to which this invention relates are useful by reason of their valuable pharmacological properties. Thus, for example, they are pepsin-inhibitors, and anti-bacterials effective against *Diplococcus pneumoniae*. On the other hand, they appear to lack the diuretic activity which has characterized various cyclopentanealkanols heretofore known in the art.

Manufacture of the 3-alkoxyaryl-2-(2-hydroxy-ethyl)-1-(1,2-dihydroxyethyl)cyclopentanols hereof proceeds by hydrogenating an appropriate 5-alkoxyaryl-2-ethynyl-2-hydroxyclopentaneacetic acid or its lactone in an ethanolic medium containing pyridine and catalyzed by palladium-on-calcium carbonate to give the corresponding 2-vinyl compound which, in turn, is consequently contacted with osmium tetroxide and aqueous sodium bisulfite in the presence of pyridine to give the corresponding 2-(1,2-dihydroxyethyl) compound. Reduction of the carbonyl group therein with lithium aluminum hydride affords the desired 3-alkoxyaryl-2-(2-hydroxyethyl)-1-(1,2-dihydroxyethyl)-cyclopentanol.

Alternatively, the carboxylic acid group in the aforesaid 2-vinyl compound is reduced with lithium aluminum hydride and the resultant diol consecutively contacted with osmium tetroxide and aqueous sodium bisulfite in the presence of pyridine to give the desired 3-alkoxyaryl-2-(2-hydroxyethyl)-1-(1,2-dihydroxyethyl)-cyclopentanol.

The 3-alkoxyaryl-1,2-di(2-hydroxyethyl)cyclopentanols derive by reduction of an appropriate 5-alkoxyaryl-2-hydroxy-1,2-cyclopentaneacetic acid or lactone and/or methyl ester thereof with lithium aluminum hydride.

The 3-alkoxyaryl-2-[2-hydroxy - 2-,2-di(lower alkyl)ethyl]-1-[1-hydroxy-1,1-di(lower alkyl)methyl] - cyclopentanols are prepared by contacting an appropriate 5-alkoxyaryl-2-ethynyl-2 - hydroxycyclopentaneacetic acid lactone with methanol, mercuric oxide, and boron trifluoride in ether and heating the product with aqueous methanolic hydrogen chloride to give the corresponding 2-acetyl-5-alkoxyaryl-2 - hydroxycyclopentaneacetic acid lactone which, in turn, is heated with an appropriate lower alkyl magnesium bromide in ethereal medium to give the desired 3-alkoxyaryl-2-[2 - hydroxy-2,2-di(lower alkyl)ethyl]-1-[1-hydroxy-1,1-di(lower alkyl)methyl]cyclopentanol.

The foregoing cyclopentanols, on contact (at room temperature) with an appropriate alkanoic acid anhydride in pyridine, afford the corresponding cyclopentanols wherein only the tertiary hydroxyls remain unesterified.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. The abbreviation "Ac" hereinafter designates the acetyl radical,

—COCH$_3$

EXAMPLE 1

(A) *2 - hydroxy-2-(1,2-dihydroxyethyl)-5-(p-methoxyphenyl)cyclopentaneacetic acid γ-lactone.*—To 26 parts of 2 - hydroxy-5-(p-methoxyphenyl)-2-vinylcyclopentaneacetic acid lactone prepared as described by Chinn et al. in J. Org. Chem., 27, 1738 (1962) and dissolved in 500 parts of pyridine is added 30 parts of osmium tetroxide. The resultant mixture is allowed to stand at room temperatures in the dark for 20 hours, whereupon a solution of 60 parts of sodium bisulfite in 900 parts of water and 500 parts of pyridine is introduced. The mixture thus obtained is stirred at room temperatures for 3 hours, then partitioned between water and chloroform. The chloroform phase is dried over anhydrous sodium sulfate and stripped of solvent by vacuum distillation. The residue, an oil, is 2-hydroxy-2-(1,2-dihydroxyethyl)-5 - (p-methoxyphenyl)cyclopentaneacetic acid γ-lactone.

(B) *2 - (2-hydroxyethyl)-1-(1,2-dihydroxyethyl)-3-(p-methoxyphenyl)cyclopentanol.*—To a mixture of 300 parts of lithium aluminum hydride in 35,000 parts of anhydrous ether at the boiling point under reflux is added, with agitation, 122 parts of 2-hydroxy-2-(1,2-dihydroxyethyl) - 5 - (p-methoxyphenyl)cyclopentaneacetic acid γ-lactone prepared as described in the foregoing Part A of this example and dissolved in 7000 parts of anhydrous ether. Agitation at the boiling point under reflux is continued for 1½ hours, at which point the mixture is cooled to room temperature and 2000 parts of water and 1500 parts of an aqueous 20% solution of sodium hydroxide introduced. The mixture thus obtained is stirred until a paste or granular solid forms, then filtered. The paste or solid thus isolated is washed with ether and taken up in 20% hydrochloric acid. The acid solution is saturated with sodium chloride and then extracted with ethyl acetate. The ethyl acetate extract is washed with aqueous saturated sodium chloride, dried over anhydrous sodium sulfate, and stripped of solvent by vacuum distillation. The residue, a viscous oil, solidifies on trituration with ether. Recrystallization of the solid from ethyl acetate affords 2 - (2-hydroxyethyl)-1-(1,2-dihydroxyethyl)-3-(p-methoxyphenyl)cyclopentanol as colorless laths melting at 135–138°. The product has the formula

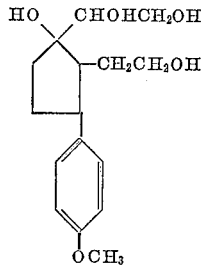

EXAMPLE 2

*2 - (2 - acetoxyethyl) - 1-(1,2 - diacetoxyethyl) - 3-(p-methoxphenyl)cyclopentanol.*—A solution of 2 parts of 2 - (2 - hydroxyethyl) - 1-(1,2-dihydroxyethyl)-3-(p-methoxyphenyl)cyclopentanol (M.P. 135–138°) in 20 parts of pyridine and 20 parts of acetic anhydride is allowed to stand at room temperatures for 17 hours, then poured into 5 volumes of ice water. The resultant mixture is extracted with ether. The ether extract is washed successively with 5% hydrochloric acid, water, aqueous 5% sodium bicarbonate, water, and aqueous saturated sodium chloride, whereupon it is dried over anhydrous sodium sulfate and stripped of solvent by distillation. The residue, a viscous oil, is 2-(2-acetoxyethyl)-1-(1,2-diacetoxyethyl)-3-(p-methoxyphenyl)cyclopentanol having the formula

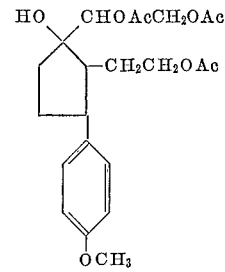

EXAMPLE 3

(A) *2 - hydroxy - 5 - (6-methoxy-2-naphthyl)-2-vinylcyclopentaneacteic acid lactone.*—A solution of 15 parts of 2 - ethynyl-2-hydroxy-5-(6-methoxy-2-naphthyl)cyclopentaneacetic acid lactone (M.P. 83–87°) in 1200 parts of ethanol and 100 parts of pyridine is maintained over 8 parts of 5% palladium-on-calcium carbonate in a hydrogen atmosphere with agitation at room temperature and atmospheric pressure until hydrogen uptake indicates that reduction of the ethynyl constituent to a vinyl group is complete. The mixture is then filtered, and the filtrate is freed of solvent by vacuum distillation. The residual oil is taken up in ether. The ether extract is evaporated under nitrogen until crystallization takes place. The crystals are filtered off and recrystallized from a mixture of ethyl acetate and ether to afford 2-hydroxy-5-(5-methoxy-2 - naphthyl) - 2-vinylcyclopentaneacetic acid lactone as colorless plates melting at 125.5–127°.

(B) *2-(2hydroxyethyl)-3-(6-methoxy-2-naphthyl)-1-vinylcyclopentanol.*—To a mixture of 10 parts of lithium aluminum hydride and 1400 parts of anhydrous ether at the boiling point under reflux is added, with agitation during 15 minutes, a solution of 7 parts of 2-hydroxy-5-(6-methoxy-2-naphthyl) - 2 - vinylcyclopentaneacetic acid lactone (M.P. 125.5–127°) in 9 parts of tetrahydrofuran and 385 parts of anhydrous ether. The resultant mixture is heated at the boiling point under reflux with agitation for 4 hours, then decomposed with water and acidified with 5% hydrochloric acid. The aqueous phase is separated and extracted with ethyl acetate; the ethyl acetate extract is combined with the ether phase; and the resultant solution is successively washed with water, aqueous 5% sodium bicarbonate, and aqueous saturated sodium chloride, then dried over anhydrous sodium sulfate and stripped of solvent by vacuum distillation. The residue, a viscous oil, is crystallized from a mixture of ether and pentane to afford 2-(2-hydroxyethyl)-3-(6-methoxy-2-naphthyl)-1-vinylcyclopentanol as colorless densely-packed platelets melting at 125–127°.

(C) *2 - (2 - hydroxyethyl) - 1 - (1,2-dihydroxyethyl)-3-(6-methoxy-2-naphthyl)cyclopentanol.* — A mixture of 1 part of 2-(2-hydroxyethyl)-3-(6-methoxy-2-naphthyl)-1-vinylcyclopentanol (M.P. 125–127°), 1 part of osmium tetroxide, and 22 parts of pyridine is maintained in the dark at room temperatures with agitation for 65 hours. A solution of 5 parts of sodium bisulfite in 75 parts of water and 50 parts of pyridine is thereupon introduced; and the resultant mixture is maintained at room temperatures with agitation for 4 hours, then extracted with chloroform. The chloroform extract is washed consecutively with water and aqueous saturated sodium chloride, dried over anhydrous sodium sulfate, and stripped of solvent by vacuum distillation. The residual oil is crystallized from a mixture of acetone and ether to give colorless triangular plates of 2-(2-hydroxyethyl)-1-(1,2-dihydroxyethyl)-3-(6-methoxy-2-naphthyl)cyclopentanol melting at approximately 150–151°. The product has the formula

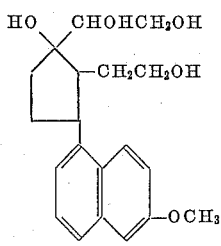

EXAMPLE 4

2 - (2 - acetoxyethyl) - 1 - (1,2 - diacetoxyethyl)-3-(6-methoxy-2-naphthyl)cyclopentanol.—A solution of 325 parts of 2-(2-hydroxyethyl)-1-(1,2-dihydroxyethyl)-3-(6-methoxy-2-naphthyl)cyclopentanol (M.P. 150–151°) in 2000 parts of pyridine and 2000 parts of acetic anhydride is allowed to stand at room temperatures for 18 hours, then poured into ice water. The resultant mixture is extracted with ether. The ether extract is successively washed with 20% hydrochloric acid, water, and aqueous saturated sodium chloride, then dried over anhydrous sodium sulfate and finally stripped of solvent by vacuum distillation. The residue, a viscous oil, is 2-(2-acetoxyethyl)-1-(1,2-diacetoxyethyl) - 3-(6-methoxy-2-naphthyl) cyclopentanol, having the formula

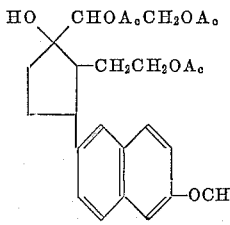

EXAMPLE 5

1,2-di(2-hydroxyethyl) - 3-(6-methoxy-2-naphthyl)-cyclopentanol.—A mixture of 11 parts of 2-hydroxy-2-methoxycarbonylmethyl-5-(6-methoxy-2-naphthyl)cyclopentaneacetic acid lactone (M.P. 101.5–102.5°), 20 parts of lithium aluminum hydride, and 2800 parts of anhydrous ether is heated at the boiling point under reflux with agitation for 2 hours, whereupon water and aqueous 20% sodium hydroxide is alternately introduced to the cooled reaction mixture until a colorless granular solid forms. The solid is filtered out and the filtrate evaporated until 1,2-di(2-hydroxyethyl)-3-(6-methoxy-2-naphthyl)-cyclopentanol crystallizes therefrom as colorless dense crystals which, isolated by filtration and dried in air, melt at approximately 142.5°–143°. The product has the formula

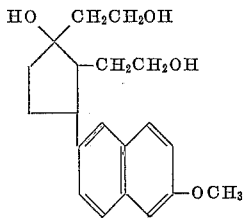

EXAMPLE 6

1,2-di(2-hydroxyethyl) - 3-(6-methoxy-2-naphthyl)-cyclopentanol.—A mixture of 14 parts of 2-hydroxy-5-(6-methoxy-2-naphthyl) - 1,2-cyclopentanediacetic acid dimethyl ester (M.P. 142–143°), 60 parts of lithium aluminum hydride, and 91,000 parts of anhydrous ether is heated at the boiling point under reflux with agitation for 2 hours, then cooled, decomposed with water, and acidified with 20% hydrochloric acid. The ether phase is thereupon separated and successively washed with water, aqueous 5% sodium bicarbonate, water, and aqueous saturated sodium chloride, whereupon it is dried over anhydrous sodium sulfate and stripped of solvent by vacuum distillation. The residue is crystallized from a mixture of ethyl acetate and hexane to afford 1,2-di(2-hydroxyethyl) - 3 - (6-methoxy-2-naphthyl)cyclopentanol as colorless triangular plates melting at 139–140.5°. This product is epimeric at carbon atom number 1 of the cyclopentane ring vis a vis the product of Example 5.

EXAMPLE 7

(A) 2 - acetyl - 2 - hydroxy-5-(6-methoxy-2-naphthyl) cyclopentaneacetic acid lactone.—To a mixture of 10 parts of mercuric oxide, 450 parts of methanol, and 40 parts of a 48% solution of boron trifluoride in diethyl ether is slowly added, with agitation, a solution of 46 parts of 2 - ethynyl-2-hydroxy-5-(6-methoxy-2-naphthyl)cyclopentaneacetic acid lactone (M.P. 83–87°) in 225 parts of methanol. The resultant mixture is maintained at room temperatures with agitation for 2 hours, then heated at the boiling point under reflux with agitation while a mixture of 90 parts of approximately 20% hydrochloric acid, 800 parts of water, and 320 parts of methanol is introduced. The mixture thus obtained is heated at the boiling point under reflux with agitation for one hour, then cooled and poured into ice water. Solid sodium bicarbonate is thereupon added in sufficient quantity to neutralize the acid, whereupon the aqueous phase is decanted and the residual gum washed with water and crystallized from a mixture of ether and pentane to give 2-acetyl-2-hydroxy-5-(6-methoxy-2-naphthyl)cyclopentaneacetic acid lactone as colorless densely-packed laths melting at approximately 115.5–116.5°.

(B) 1 - (1 - hydroxy-1-methylethyl)-2-(2-hydroxy-2,2-dimethylethyl) - 3 - (6 - methoxy-2-naphthyl)cyclopentanol.—A mixture of 29 parts of methyl magnesium bromide in 55 parts of diethyl ether with 400 parts of anhydrous ether and 3 parts of 2-acetyl-2-hydroxy-5-(6-methoxy-2-naphthyl)cyclopentaneacetic acid lactone (M.P. 115.5–116.5°) is heated at the boiling point under reflux with agitation for 2 hours, then cooled and decomposed by the successive addition of water and aqueous saturated ammonium chloride. The ether phase is thereupon separated, successively washed with water and aqueous saturated sodium chloride, dried over anhydrous sodium sulfate, and concentrated by evaporation under nitrogen until 1 - (1-hydroxy-1-methylethyl)-2-(2-hydroxy-2,2-dimethylethyl) - 3-(6-methoxy-2-naphthyl)cyclopentanol crystallizes out. The product is filtered off and recrystallized from a mixture of ether and pentane as colorless laths melting at approximately 164–164.5°. The product has the formula

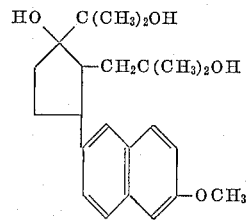

What is claimed is:
1. A compound of the formula

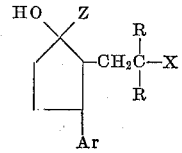

wherein Ar is selected from the group consisting of radicals of the formulas

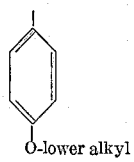

O-lower alkyl and

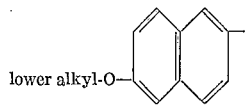

R is selected from the group consisting of hydrogen and the methyl radical, X is selected from the group consisting of hydroxyl and a radical of the formula

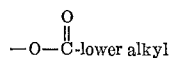

and Z is selected from the group consisting of radicals of the formulas

—CH₂CH₂X
—CHXCH₂X and

—C(CH₃)₂X in which X is defined as before, Z being —C(CH₃)₂X when R is methyl.

2. 2 - (2 - hydroxyethyl) - 1 - (1,2-dihydroxyethyl)-3-(p-methoxyphenyl)cyclopentanol.

3. 2 - (2 - acetoxyethyl) - 1 - (1,2 - diacetoxyethyl)-3-(p-methoxyphenyl)cyclopentanol.

4. 2 - (2 - hydroxyethyl) - 1 - (1,2-dihydroxyethyl)-3-(6-methoxy-2-naphthyl)cyclopentanol.

5. 1,2 - di(2 - hydroxyethyl)-3-(6-methoxy-2-naphthyl)cyclopentanol.

6. 1 - (1 - hydroxy - 1 - methylethyl)-2-(2-hydroxy-2,2-dimethylethyl)-3-(6-methoxy-2-naphthyl)cyclopentanol.

No references cited.

LORRAINE A. WEINBERGER, *Primary Examiner.*
LEON ZITVER, *Examiner.*